United States Patent
Sianesi et al.

[15] 3,699,145
[45] Oct. 17, 1972

[54] FLUORINATED OXYGEN-CONTAINING PRODUCTS AND PROCESS FOR PREPARATION THEREOF

[72] Inventors: Dario Sianesi; Adolfo Pasetti; Costante Corti, all of Milan, Italy

[73] Assignee: Montecatini Edison S.p.A., Milan, Italy

[22] Filed: May 1, 1970

[21] Appl. No.: 31,852

Related U.S. Application Data

[63] Continuation of Ser. No. 650,257, June 30, 1967, abandoned, which is a continuation-in-part of Ser. No. 446,292, April 7, 1965, Pat. No. 3,442,942.

[30] Foreign Application Priority Data

July 6, 1966    Italy.....................15625 A/66
Dec. 16, 1966    Italy.....................31193 A/66

[52] U.S. Cl. ...............260/463, 204/158, 260/340.9, 260/535 H, 260/544 F, 252/67
[51] Int. Cl. ..............................................C07c 69/64
[58] Field of Search......................................260/463

[56] References Cited

UNITED STATES PATENTS

3,125,599   3/1964   Warnell.....................260/544
3,250,806   5/1966   Warnell.....................260/544
3,293,306   12/1966   Bleu et al..................260/544

*Primary Examiner*—Alex Mazel
*Assistant Examiner*—James H. Turnipseed
*Attorney*—Hubbell, Cohen & Stiefel

[57] ABSTRACT

Perfluorinated cyclic ethers and fluorinated linear polyethers. Prepared by photochemical reaction in liquid phase of perfluoropropylene with oxygen in presence of ultraviolet radiation.

5 Claims, No Drawings

3,699,145

FLUORINATED OXYGEN-CONTAINING PRODUCTS AND PROCESS FOR PREPARATION THEREOF

CROSS REFERENCE TO RELATED APPLICATION

This application is a continuation of copending application Ser. No. 650,257, filed June 30, 1967, now abandoned, which application is in turn a continuation-in-part application of our U.S. patent application Ser. No. 446,292 filed Apr. 7, 1965 now U.S. Pat. No. 3,442,942 issued Apr. 7, 1969.

BACKGROUND OF THE INVENTION

1. Field of the Invention

This invention relates to new products consisting essentially of carbon, fluorine and oxygen atoms having the structure of linear polyethers or of cyclic ethers, to a process for preparation thereof, and to a new method for the preparation of epoxide of perfluoropropylene, $COF_2$ and $CF_3$—COF.

Chemical resistance and thermal resistance are two of the most attractive and appreciated characteristics of fluoro-organic compounds which contain a high percentage of combined fluorine in their molecules. Because of these and other favorable physico-chemical properties, the fluorinated compounds are of great interest and have found numerous useful applications.

For many of these applications, fluorinated substances containing chemically reactive functions, e.g., double bonds, carboxyl groups and their derivatives, carbonyl groups etc., in their molecules, are highly desired. These reactive groups permit various subsequent transformations of these molecules, which determine their particular physico-chemical characteristics and make possible their chemical interaction with other molecules.

For other applications, e.g., for use as fluids for heat transfer, for lubrication under particular conditions, or for electric insulation, there are required high molecular weight fluorinated compounds which (1) are liquid over a wide range of temperatures, (2) have a relatively low vapor pressure and (3) exhibit a high degree of chemical and thermal stability. For these and other applications, perfluorinated products are highly suitable, i.e., products which do not contain appreciable amounts of elements other than carbon and fluorine and, in particular, do not contain hydrogen in their molecule. Such perfluorinated products, in fact, generally possess the highest characteristics of chemical inertia and often of thermal stability.

2. Description of the Prior Art

It is known that fluorinated and perfluorinated products having a rather high molecular weight can be readily obtained by polymerization and copolymerization of fluoro- and perfluoro-olefins. Usually, however, the products thus obtained are high polymers having the appearance and characteristics of solid substances, either at room temperature or at somewhat higher temperatures. Accordingly, they are unsuitable for most of the applications referred to above, wherein it is necessary to employ materials having a low volatility but being liquid at room temperature and over a wide range of temperatures.

Attempts have been made to obtain high molecular weight fluorine-containing products possessing these characteristics by telomerization reactions of fluoro-olefins. By this type of reaction, for which considerable descriptive literature exists, various products were obtained. The chemical structure of these products can be represented by the general formula $X(A)_nY$, wherein $X$ and $Y$ are atoms or atom groups derived from the telogenic agent $XY$ employed, $A$ is a combined unit of the fluoro-olefin, and $n$ is an integer between 1 and 100.

However, the telomers that can be obtained from the fluoroolefin, and in particular from fluoroethylene, which as a practical matter are the only telomers that can easily be obtained, exhibit a significant drawback which hinders their use for many of the desired applications. Thus, the molecules of the telomers consist essentially of a regular sequence of equal (A) units bound one to another by carbon to carbon bonds. This imparts to the molecules a considerable rigidity and a high tendency to crystallize. It is also known that rotation around the C—C bonds is hindered by a strong energy barrier, in contrast to the condition existing with the C—O bonds. Thus, C—O bonds have a considerable freedom of rotation. It is also known that the linearity and regularity of structure of the macromolecules appreciably promotes the crystallization process. Consequently, when a telomer of, for example, a fluoroethylene has a value n sufficiently high to render its vapor pressure negligible or very low, it is normally a solid or a wax at room temperature. When the telomer is brought to the molten state by heating, it generally becomes a highly volatile liquid, having a low viscosity and a high variation of viscosity with temperature, so that it is accordingly, unsuitable for most of the desired applications.

It is known, for example from Belgian Patent 616,756, French Patents 1,359,426 and 1,362,548, to prepare perfluoroethers by polymerizing epoxides of perfluoroolefins in the presence of active carbon or alkaline catalysts. The products thus obtained are polyperfluoroalkylenethers having a thoroughly regular structure as regards both the units forming the chain and their distribution and are characterized by the fact that each of their two terminal groups is the same in all chains. These products consist of chains wherein C—O and C—C bonds are regularly alternated (—C—C—O—C—C—O—). As said before, C—C bonds have a marked energy barrier which tends to oppose their rotation where-as this is not the case for C—O bonds.

It is desirable, moreover, to have available products having a higher incidence of C—O bonds in respect to C—C bonds in the polymeric chains. Furthermore, it is desirable to have available products containing peroxidic groups.

SUMMARY OF THE INVENTION

We have found that it is possible to obtain products having good dielectric, viscosity and lubricating characteristics, and which because of the possibility of a higher incidence of C—O bonds in respect to C—C bonds may have improved properties as regards variations of viscosity with temperature, by means of direct reaction of perfluoropropylene with molecular oxygen under ultraviolet radiations. Stable products having a very high molecular weight and containing only carbon, fluorine and oxygen atoms in their molecules are obtained. Their structures vary depending upon the reaction conditions, and they consist of chains; wherein there can be present sequences of C—O bonds and also —O—O— bonds, and different terminal groups. Said products are obtained according to the present invention by means of direct reaction of perfluoropropylene with molecular oxygen or with a gas containing oxygen, by operating in the liquid phase, at temperatures between −100° and +80°C, under a pressure between 0.1 and 40 atmospheres (preferably between 1 and 10 atmospheres), in the presence of ultraviolet radiations having at least 1 percent of radiations of a wave length lower than 3,300 A. The new products of this invention are (1) cyclic perfluorinated ethers having the formula

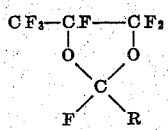
I in which R may be F or $CF_3$, and (2) linear perfluorinated polyethers and mixtures thereof of the general formula

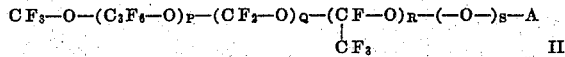
II wherein: $C_3F_6$ is a perfluoroalkylene unit derived from the opening of the double bond of a hexafluoropropylene molecule, the different perfluoroalkylene units having a random distribution along the polyether chain; A is a functional group selected from the group consisting of —COF, —$CF_2$—COF and —$CF(CF_3)$—COF; and P, Q, R and S may be the same or different numbers, Q, R and S may each or all be equal to zero, the sum of P+Q+R being a number between 1 and 100, the ratio (Q+R)/P being a number between zero and 2, and preferably between zero and 1, the ratio S/(P+Q+R) varying between zero and 0.5, the ratio S/P being a number between zero and 1, preferably between zero and 0.5. When integer S is zero, the linear perfluorinated polyethers (II) of this invention, for sufficiently high values of P, will exhibit the structure of true homopolyethers when Q and R in the above formula are zero, and are to be regarded as true copolymeric polyethers or copolyethers when perfluoroalkylene units different from $C_3F_6$ are also present in the chain, i.e. when Q or R or both of them are different from zero.

It is noted that linear perfluorinated polyethers conforming to the foregoing formula (II) may possibly contain therewithin units of $C_3F_6$ bonded directly to one another. Any such units are present in extremely minor amounts, i.e., less than about two per cent by weight, and if present do not affect the properties of the polyethers.

DESCRIPTION OF THE PREFERRED EMBODIMENTS

The various perfluoroalkylenic units forming the chains of the new polyether products (II) are considered as being distributed in a random manner, since there are no particular criteria for imposing either successions of the same units or alternations of different units. On the other hand, the units indicated by the symbol (—O—) correspond to the presence of peroxidic bonds. That is, these units do not form sequences and must be understood as always being between two fluoroalkylenoxy units.

The polyethers (II) of this invention are usually obtained in the form of a mixture of molecules having different molecular weights, different distributions of the various units, and presumably also different compositions. One can, of course, isolate from these mixtures pure chemical compounds, characterized by a given structure of the terminal group A, by a given distribution of the various units in the chains, and by a precise value for the indexes P,Q,R,S, the last three indexes having effectively a value of zero or of a whole number.

It is, however, frequently preferably, in order to characterize the structure of the whole polymer, to have recourse to concepts usually used in the field of the macromolecular chemistry and, more particularly in the field of copolymers and terpolymers, such as the concepts of average molecular weight and of average composition. In this case, the formula II reported above remains perfectly valid, but each of indexes P,Q,R,S represent an average value and can therefore have a value not necessarily corresponding to that of a whole number. Moreover, the structure of terminal group A cannot in this case be indicated by a simple formula since it results from the contribution of the aforementioned possible different structures.

The present invention also relates to a process for the preparation of perfluoropropylene epoxide, $COF_2$, $CF_3$—COF, perfluorinated cyclic ethers of the formula I, linear perfluorinated homopolymers of —$CF_2$—$CF(CF_3)$—O— units, and copolymers of —$CF_2$—$CF(CF_3)$—O— units with up to 66 percent by mols of units of one or both of —$CF_2$—O— and —$CF(CF_3)$—O— units, such homopolymers or copolymers containing from zero to 5 peroxidic oxygen atoms per 10 combined oxygen atoms and having as the terminal groups the group $CF_3$—O— at one end and at the other end the functional group —COF, —$CF_2$—COF or —$CF(CF_3)$—COF. The process comprises subjecting perfluoropropylene, in the liquid phase either alone or diluted with an inert solvent, to a photochemical reaction with molecular oxygen at a temperature between about −100°C and +80°C, at a pressure between about 0.1 and 40 atmospheres, in the presence of ultraviolet radiation containing at least 1 percent of radiation having a wave length less than 3,300 A, the oxygen being fed to the liquid reaction phase in such amount as to maintain the liquid phase continuously saturated with oxygen.

In order to maintain perfluoropropylene in the liquid phase at the temperature selected for the reaction, a sufficiently high total pressure (which can be as much as 40 atmospheres) is used. As can be seen from the experimental examples reported hereinafter, in the range of preferred temperatures, the pressure under which the reaction is carried out does not markedly influence the chemical structure of the reaction product. However, the pressure must be such as to maintain in the liquid phase at least most (i.e., greater than 50 per cent and preferably greater than 80 per cent) of perfluoropropylene present in the reaction zone and the partial pressure of molecular oxygen must be of at least 0.1 atmosphere.

The process may be conveniently carried out by passing a stream of molecular oxygen or of an oxygen-containing gas such as, e.g., air, through a liquid phase of hexafluoropropylene, in the presence of U.V. radiations as previously defined. Within the scope of our process, one can select operating conditions whereby there is obtained a high degree of specificity towards the formation of one type of products rather than of another among the products previously defined. For example, a high specificity toward the formation of the epoxide of $C_3F_6$ can be obtained, i.e. a ratio between the epoxide and the higher molecular weight compounds of about 1:1 (50 percent epoxide) or more, when the process is carried out under pressure, preferably in excess of atmospheric, and at a temperature close to the boiling point of the liquid phase under such pressure. Conversely, the ratio between the epoxide and other reaction products having higher molecular weight decreases, and can be less than 0.01:1 as the operating temperature of the process is decreased, thus increasing the difference between the temperature employed and the boiling temperature of the system under the adopted pressure.

The structure of the linear polymeric products and mixtures thereof included in the general formula II are highly influenced by two main parameters of the reaction: (1) the temperature and (2) the irradiation intensity of the liquid reaction phase. By appropriate selection of the operating conditions for these two parameters it is therefore possible to direct the reaction toward the formation of one type of product rather than toward another.

It has been found that essentially polymeric products are obtained of the formula $$CF_3-O-(C_3F_6O)_P-(-O-)_S-A$$

wherein P, S and A are as previously defined, by carrying out the reaction at temperatures lower than about −10°C, and preferably between about −80° and −40°C. Indeed, in the lowest range of temperature the content of perfluoroalkylenoxy units other than —$C_3F_6$—O— in the molecular chain of the resulting polyethers is so low as to have virtually no appreciable influence on the properties of the products and these products may be considered to be of the homopolyether type.

When the reaction is carried out at a temperature of about −10°C there are present in the mixture of final polyethers minor amounts (about 2-3 percent by mols) of other perfluoroalkyleneoxide units different from the principal unit —$C_3F_6O$. When operating at higher temperatures, and particularly at temperatures higher than 0°C, the percentages of units of —$CF_2$—O— and/or

in the reaction product increases. Thus, the higher the temperature, the higher the percentages of such other units, so that these units become a very important characterizing feature of the copolyether chain. Thus, by operating at increasingly higher temperatures and approaching the limit of about 80°C, the copolyether reaction products will contain up to 66 percent by mols of —$CF_2$—O— and/or

units.

Thus, when a temperature above −10°C is used, the average molar ratio between the units —$CF_2$—O— and

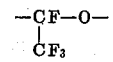

and the units —$C_3F_6O$—, will have a value within the limits of 0.02 and 2. This ratio, as will also be seen in the following experimental examples, increases upon increasing the reaction temperature.

In addition, the temperature influences very markedly the average molecular weight of the polymeric products, i.e. the value of the sum of P+Q+R. The highest average molecular weights will generally be obtained at the lower temperatures whereas lower average molecular weights are obtained by operating at higher temperatures.

Moreover, it is also possible to regulate the average molecular weight in order to obtain the desired value by varying the concentration of $C_3F_6$ in the liquid phase. The higher molecular weights are obtainable by using a high concentration of $C_3F_6$, e.g., by using undiluted $C_3F_6$, whereas lower molecular weights are obtained by diluting the $C_3F_6$ with a solvent.

As previously pointed out, the crude polymeric product obtainable by the process of this invention is generally characterized by a rather wide distribution of molecular weights, as usually occurs in all telomerization, oligomerization and polymerization reactions. It is therefore necessary to have recourse to average values of molecular weight in order to characterize the entire crude polymeric product.

Another important characterizing feature of our polymeric products is the content of peroxidic oxygen, for example, which is shown by one of the ratios S/P, S/(P+Q+R) or S/(P+Q+R+1). This last ratio is the most meaningful insofar as it represents the ratio between the number of peroxydic bridges and the sum of all the —C—O—C— and —C—O—O—C— bridges present throughout the chain.

As previously noted, the content of peroxydic bridges in the crude polymeric product is such that the S/P ratio can vary from zero to 1.

The concentration of peroxidic groups depends on the intensity of irradiation and can be varied within the limits desired by utilizing suitable average irradiation conditions in the reaction zone. The concentration of the peroxidic groups depends also on the degree of conversion actually obtained during the reaction.

The average intensity of irradiation of a reaction system is in general a quantity that is difficult to define by numbers, since it depends on several parameters and is highly influenced by the particular geometry of the reaction system. A meaningful indication of the average value of the irradiation intensity in a sufficiently symmetric reaction system can however, be inferred from a consideration of three fundamental elements:

1. the amount of useful U.V. radiations having a wave length lower than 3,300 A penetrating the reacting phase, E (watts);
2. the surface through which the radiations penetrate the reaction system, S (cm²); and
3. the volume of the reaction system, V (cm³).

If we consider, e.g., the particular instance in which the U.V. radiation source is placed completely inside the reaction system and the surface S consists of a material that is completely transparent to the useful U.V. radiations, the value of E can be considered as equal to the amount of radiations, having useful wave length, emitted by the source. If on the contrary, either because the U.V. source is placed outside the reaction system or because between the U.V. source and the reacting system there is placed a medium having a certain absorption power for the radiations, so that only a portion of the useful radiations emitted by the source reach surface S or in any event penetrate the reaction system, the value of E can then be calculated, either through a simple consideration of geometric factors or by a real measurement of the quantity of useful radiations as can be obtained by having recourse to actinometric methods, well known to people skilled in the art.

The value of surface S must be considered in an appropriate manner, namely, by referring to geometric surface of an ideal type which most nearly could be compared with the actual surface.

In other words, the value of S must be calculated without taking into account surface irregularities or slight differences with respect to the perfect geometrical form. The reaction volume must be considered as equal to that which can be actually reached by the U.V. radiations, without taking into account the possible phenomena of absorption of the radiations by the liquid medium.

We have observed that, in order to represent in a meaningful way the situation of average irradiation which characterizes a particular reaction system and which would directly influence the formation of relatively more or less peroxidized reaction products, one may have reference to an "average irradiation index" I, which is defined by the equation $$I = [(100 \times E)/(S^{1/2} V^{1/3})] \text{ (watt/cm}^2\text{)}$$

wherein $E$, $S$ and $V$ have the aforedescribed meaning.

We have ascertained that it is possible to obtain, from liquid perfluoropropylene and oxygen, reaction products having a desired content of peroxidic groups, by using an average irradiation index of from 0.1 to 50 watts/cm$^2$. A low content of peroxidic oxygen, i.e. $S/(P+Q+R+1)$ less than 0.2, is obtained by adopting reaction conditions whereby index I is greater than 2 and preferably greater than 3. On the contrary, with values of I less than 2, or preferably less than 1, polyethers containing substantial content of peroxidic groups, i.e. $S/(P+Q+R+1)$ greater than 0.2 can be obtained.

It should be noted, however, that not only the irradiation conditions will influence the extent of the peroxidic nature of the reaction products. Thus, other reaction conditions, such as, e.g., the degree of conversion, will also affect this characteristic of the products. More particularly, it has been ascertained that even in the presence of a sufficiently high average-irradiation intensity (I greater than 2), the polyether products formed in the initial step of the photochemical reaction between liquid perfluoropropylene and oxygen, may contain a considerably quantity of peroxidic groups. The average content of peroxidic oxygen of the products decreases rapidly, however, as the reaction progresses, so that, when e.g., a conversion higher than 5–10 percent of the perfluoropropylene initially present in the reaction zone is reached, the peroxidic content reaches a practically constant value that can be either zero or very slight, depending upon the particular value of I. Conversely, even by using a rather low intensity of irradiation, for example, lower than 1, it is possible to obtain polyethers having a reduced content of peroxidic oxygen, such as $S/(P+Q+R+1)$ lower than 0.2, by carrying out the reaction to a high final degree of conversion, for example, of the order of 60–70 percent.

The statements previously made relating to the effect of the average-irradiation intensity on the peroxidic character of the reaction products should, in a strict sense, actually be referred to the products obtained at conversions not less than about 5 percent and not greater than about 70 percent.

Additionally, it has been ascertained that the reaction temperature exerts a certain influence on the characteristics of the products, in the sense that by lowering the reaction temperature below about −65°C the irradiation conditions being the same, the reaction products tend to have a higher content of peroxidic groups.

As regards the amount of oxygen to be employed in order to maintain the liquid reaction phase saturated with oxygen, it was ascertained that an excess of oxygen should be used with respect to the amount of oxygen consumed during the reaction. In other words, the rate of oxygen fed into the reaction zone should exceed the rate at which the oxygen is being consumed during the reaction.

For example, when operating at about atmospheric pressure, the excess of oxygen in the liquid reaction phase can be obtained by bubbling into the reaction mixture an amount of oxygen, either in pure state or diluted in an inert gas, that is at least twice that amount that is simultaneously being consumed. The excess of oxygen leaving the reactor carries along such volatile reaction products as $COF_2$ and $CF_3$—COF. It is also possible to operate without having an outflow of oxygen from the reactor. In such instance, in order to operate in the presence of an excess of oxygen, it is necessary to maintain a high oxygen partial pressure in the reactor while the reaction is carried out. This can be obtained, for example, by operating at low temperatures (of the order of −40° to −60°C) and at a pressure higher than atmospheric, preferably above 4 to 5 atmospheres and by continuously maintaining such pressure so as to replenish the amount of oxygen consumed. In this instance, the high pressure maintains the partial pressure of the volatile reaction products in the vapor phase at a low value, so as not to disturb the reaction that thus can continue so long as there is oxygen available in the liquid mixture, i.e., the oxygen concentration in the liquid mixture is maintained at saturation.

We have also found that it may be convenient to carry out the photochemical reaction between oxygen and perfluoropropylene in the presence of a liquid phase by adding to the reaction system another compound which is liquid under the reaction conditions. This diluent may be any of various compounds which do not appreciably react with oxygen under the selected irradiation conditions. The diluent may or may not act as a solvent for either the perfluoropropylene used in the reaction or for some or all of the reaction products.

Compounds which are suitable for this purpose include, for example, perfluoro compounds such as perfluorodimethylcyclobutane, liquid perfluoro-paraffins, perfluorocyclobutane, perfluorobenzene, perfluoroamines such as tri-perfluorobutylamine, straight chain or cyclic perfluoro ethers such as for example perfluoropropylpyrane, and oxygenated perfluoro compounds which may be obtained according to the present process, such as hexafluoropropylene epoxide. In addition, wholly or partially chlorinated compounds may be used as the reaction medium, e.g., carbon tetrachloride, chloroform, methylene chloride, methylchloroform, or chlorofluoro derivatives of methane, ethane or propane, such as $CF_3Cl$, $CF_2Cl_2$, $CFCl_3$, $CHF_2Cl$, $CHFCl_2$, $CF_2Cl-CF_2Cl$, $CFCl_2CF_2Cl$, $CCl_3-CF_3$, $CF_2Cl-CH_3$, $CF_3-CFCl-CF_2Cl$ etc.

The reaction may be carried out according to an essentially batchwise technique. In such case, into a reactor containing the initial charge of liquid perfluoropropylene either in the pure state or in solution in preferably per-halogenated solvents, at the pressure and temperature conditions selected for the reaction, with irradiation by means of an U.V. light from a suitable source such as a mercury vapor lamp, there is introduced a stream of molecular oxygen or of a gas containing molecular oxygen such as air, such introduction preferably being across the entire liquid phase. The excess oxygen leaving the liquid phase is saturated with perfluoropropylene and also contains most of the low molecular weight degradation products and other volatile reaction products such as, e.g., the epoxide $C_3F_6O$. By means of a suitable reflux condenser, most of the entrained perfluoropropylene is removed and recycled back to the reaction zone, while the low molecular weight products having an acidic character are separated from the oxygen by washing with water or alkaline solutions.

The thus purified oxygen, after careful drying, may be recycled to the reaction, together with added oxygen to replace the amount already consumed in the reaction. The reaction is carried on under the foregoing conditions until the conversion of the desired amount of initial perfluoropropylene is reached. Thereafter the U.V. irradiation is stopped and by distillation of residual perfluoropropylene, if present, and of cyclic perfluorinated ethers, there is obtained as residue the higher molecular weight linear reaction products in the form of a colorless viscous oil.

It is also possible and frequently preferable to carry out the reaction in a completely continuous manner so as to obtain higher homolog (higher molecular weight) reaction products. In such instance, a portion of the liquid phase present in the reaction zone is continuously removed from the system. By suitable means, e.g., by distillation perfluoropropylene is separated from the reaction products in such portion and is continuously recycled to the reactor while the amount of perfluoropropylene consumed by the reaction is taken into account and added as make up.

The determination of the actual average structure of the linear polyethers may be carried out by suitable chemical or spectroscopic analysis.

The empirical formula of constitution can be obtained from the data of elemental analysis and from a determination of the average molecular weight (e.g., by osmometric or vapor pressure measurements). The content of oxygen linked in the peroxidic form may be determined by iodometric analysis.

The linear polyethers obtained by reaction of oxygen with hexafluoropropylene under the described conditions, have terminal chain groups generally consisting of $CF_3O-$ groups and of $-COF$ groups, these last groups being bound either to an oxygen atom or to a carbon atom, such as, e.g., $-CF_2-COF$, or

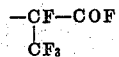

These $-COF$ groups are revealed in the infrared absorption spectrum by a characteristic absorption in the 5.25 $\mu$ zone. nuclear magnetic resonance spectrum of F gives all the other desired data, both qualitative and quantitative, to identify the nature of the units in which fluorine appears and their respective amounts.

In this spectrum, the presence in the chain of the group $-O-CF_2-CF(CF_3)-O-$ is indicated by the resonance of 5 fluorine atoms in the zone of +80 p.p.m. (from $CFCl_3$) and of 1 fluorine atom in the zone of +144 p.p.m. The resonance bands in the zones of +49 p.p.m. and +51 p.p.m. are due to the two fluorine atoms of the group $-O-CF_2-O-$ whereas the bands in the zone of +55 p.p.m. show the presence in the chain of repeating units $(O-CF_2)_n-$ with $n \geq 2$. The resonance in the zone of 90 p.p.m. indicates the presence of the tertiary fluorine atom in the $-O-CF(CF_3)-O-$ group.

In the same N.M.R. spectrum there are also indicated, as shown in the following table, the different terminal groups that may be present in the reaction products obtained from the photochemical reaction.

| Terminal Groups | p.p.m. from $CFCl_3$ | number of fluorine atoms |
|---|---|---|
| $CF_3-O-CF_2-CF(CF_3)-O-$ | +55.8 | 3 |
| | +85.3 | 2 |
| $CF_3-O-CF(CF_3)-CF_2-O-$ | +54 | 3 |
| $CF_3-O-CF_2-O-$ | +57.8 | 3 |
| $CF_3-O-CF(CF_3)-O-$ | +55.2 | 3 |
| | +99 | 1 |
| | +86.5 | 3 |
| $-O-CF_2-CF(CF_3)-O-COF$ | +11.5 | 1 |
| | +77.8 | 3 |
| | +143 | 1 |
| $-O-CF(CF_3)-CF_2-O-COF$ | +12.2 | 1 |
| $-O-CF_2-O-COF$ | +14.8 + 15.0 | 1 |
| | +58 + 59 | 2 |
| $-O-CF_2-COF$ | -13.3 | 1 |
| $-O-CF(CF_3)-COF$ | -26 | 1 |

The presence of peroxidic oxygen in the product is indicated and its content determined by reacting a sample of the obtained product with NaI dissolved in acetic anhydride and then titrating the freed iodine with thiosulphate. Thus, 200 mg of product are dissolved in 5 cc of $CF_2Cl-CFCl_2$. To this solution are added 20 cc of acetic anhydride and 2 g of NaI. The whole is stirred for 1 hour at room temperature; then 200 cc of water containing 2 g of KI are added thereto, followed by additional stirring for a few minutes and then titrating with 0.1 N sodium thiosulphate. The grams of active oxygen per 100 grams of product are calculated using the formula (8 · n)/(100 · p) = grams of active oxygen/100 g product wherein $n$ indicates the cc of 0.1 N solution of thiosulphate used and $p$ is the amount in grams of the weighed product.

The presence of peroxidic groups is also clearly indicated by the N.M.R. spectrum of fluorine, since it shows resonance bands in the zones of 75, 85, 89, 134, 137 and 142 p.p.m. from $CFCl_3$.

The presence of units of $C_3F_6$ bonded directly to each other is considered to be indicated by the N.M.R. spectrum of fluorine, since it shows resonance bands in the zones between +68 and +73 p.p.m. from $CFCl_3$. Further, other large resonance bands that are attributed to these same units appear in the zones between +76 and +80 p.p.m. and between +130 and +143 p.p.m. from $CFCl_3$.

It is therefore clear that from an examination of the magnetic resonance spectrum of fluorine and from the data obtained by chemical analysis of more conventional type, the actual average chemical composition of the polyetheric polymeric products of the present invention can be ascertained in a satisfactory manner.

The crude linear polyether reaction product can be used as is for various applications, and fractions characterized by a relatively restricted molecular weight distribution, such as those obtainable by simple distillation, may be entirely suitable, without the necessity of isolation as pure chemical compounds. However, pure compounds that are homologous members of the series of products within the scope of the general formula of the products of this invention can be separated from the crude mixture. An example of the series having the formula $$CF_3 - O - (C_3F_6O)_P - A$$

is the compound

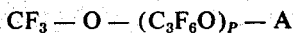

and its higher members as shown in Example 10 hereinafter.

Furthermore, pure products belonging to series that can be represented by the formulas $$CF_3 - O - CF_2 - O - (C_3F_6 - O)_P - A \text{ and}$$

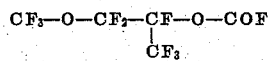

were separated and characterized as shown in Example 10.

Cyclic ethers obtained according to our process are: $C_4F_8O_2$, perfluoro-4-methyl-1,3-dioxolane (b.p. 8°C)

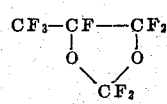

and $C_5F_{10}O_2$, perfluoro-2,4-dimethyl-1,3-dioxolane (b.p. 32.5°C)

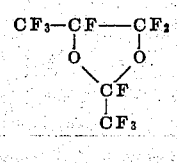

These two cyclic ethers are new chemical products characterized by extremely high chemical and thermal resistances.

The fields of applications of the products of the invention are remarkably wide due to the particular chemical structure of the products considered.

For instance, those products containing a high content of peroxidic groups find utility as cross-linking agents for elastomeric polymers such as fluorinated polymers and copolymers, e.g. copolymers of vinylidene fluoride and hexafluoropropylene.

The non-peroxidic polyethers are liquids which, depending upon their molecular weights, may have a boiling temperature from as low as of the order of 10°–20 °C, under normal pressure (low molecular weight materials) to more than 200°C under reduced pressure of 1 mm Hg (high molecular weight materials). They have very high chemical and thermal stability and exhibit very good lubricating properties. For these reasons they may be used as hydraulic fluids, heat exchange liquids, and/or as lubricants under particularly severe temperature conditions.

For certain applications, such as those involving use at very low temperatures (down to −100°C) and those wherein only a very low variation in the viscosity at different temperatures is permitted, the copolymeric polyethers are preferred over the homopolymeric polyethers, since the former show a higher incidence of C—O bonds in the oligomeric chain. This leads to a lower rigidity in the molecular structure, with the advantage that the products exhibit a lower viscosity at a given molecular weight, or a lower volatility at a given viscosity.

Another advantage is afforded by virtue of the low variation in viscosity with temperature. It is well known in fact that, whereas C—C bonds have a marked energy barrier which tends to oppose their rotation, this is not the case for C—O bonds, and therefore a higher ratio —C—O—/—C—C— bonds in the main chain causes the above described effects. Homopolyethers are thus preferably used for those applications wherein an extreme chemical and thermal stability is required, such as applications for heat-transfer and lubrication under conditions of high temperatures, high pressures and/or in the presence of strongly reactive chemicals.

The cyclic ethers can be used as solvents or plasticizers for halogenated organic compounds, generally, and in particular, for fluorinated organic compounds.

The following examples will further illustrate our invention. All parts are by weight unless otherwise stated.

EXAMPLE 1

An apparatus was set up consisting of a three-neck glass flask having a capacity of 1.5 liter and provided with a thermometer, a gas inlet dipping tube reaching the bottom and communicating with the atmosphere through a reflux condenser cooled by a cooling mixture maintained at $-78°C$.

Into the reactor there was introduced a quartz ultraviolet-ray lamp of the Original Hanau Q 81 type, having a tubular shape and a size of $245 \times 20$ mm. This lamp had an absorption of 70 watts and generated a wave-length emission mainly between 2,400 and 4,400 A, amounting to 12.8 watts. In such emission the radiations having a wave-length lower than 3,300 A corresponded to 3.8 watts. The calculated index I was between 3.5 and 4. 1230 g of pure perfluoropropylene were condensed into the reactor, which was maintained by external cooling means at a temperature of $-78°C$.

While maintaining the external cooling so as to keep the temperature of the liquid between $-60°$ and $-30°C$, the U.V. lamp was switched on. By means of a circulation pump, a stream of anhydrous oxygen (130 l/h) was sent through the inlet pipe dipping down to the bottom of the reaction vessel. The gas leaving the reaction vessel after having passed through the reflux condenser was washed with an aqueous KOH solution having a concentration of 20 percent and then collected in a 50 liter gasometer from which, after drying, the gas was once more picked up by the pump and recycled into the reaction zone. Oxygen in an amount equivalent to that consumed in the reaction was periodically fed to the gasometer.

After 28 hours, about 75 Nl (liters under normal conditions) of oxygen were absorbed and the reaction was stopped. The unreacted perfluoropropylene and those reaction products having a boiling temperature below 30°C at atmospheric pressure were separately distilled and removed from the reaction vessel. 650 g of a mixture containing 78 percent by weight of $C_3F_6$ and 19 percent by weight perfluoropropylene epoxide (b.p. $-29°C$) were thus obtained.

The liquid reaction products amounted to 650 g and had the appearance of a colorless, transparent viscous oil.

The percent composition of this product was : C = 21.4 percent F = 68.7 percent; O = 9.9 percent and therefore the corresponding average empirical formula was $(C_3F_6O_{1.05})_n$ wherein n was found by determination of molecular weight to be about 20-22.

The N.M.R. spectroscopic determination was in agreement with the average formula $$CF_3-O-(C_3F_6O)_P-(CF_2O)_Q-(CF-O)_R-(-O-)_S-A$$
$$|$$
$$CF_3$$

wherein A is COF with a ratio of the two fluoroformate isomer groups,

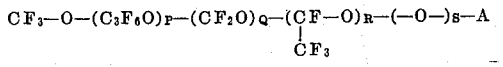

of 3:1;

the (Q+R)/P ratio was about of 0.03 and the R/Q ratio was about of 0.1. The N.M.R. spectrum did not show resonance bands due to peroxidic groups. By iodometric analysis carried out as previously described, the presence of active oxygen was determined in an amount that corresponds to 0.4 g/100 g of total product, which means that the S/(P+Q+R+1) ratio was 0.04.

The products were distilled without reflux. The following fractions were thus obtained.

| Fraction | Distillation Interval | Grams |
|---|---|---|
| a) | 30–40°C/760 mm | 11 |
| b) | 40–64°C/760 mm | 8.5 |
| c) | 50°C/20 mm – 105°C/20 mm | 37 |
| d) | 55°C/0.5 mm – 100°C/0.2 mm | 40 |
| e) | 100°C/0.2 mm – 155°C/0.2 mm | 53 |
| f) | 155°C/0.2 mm – 350°C/0.1 mm | 462 |
| g) | residue | 30 |

Fractions a), b) and c), which were liquid, had sharp, acrid odors and developed hydrofluoric acid fumes when exposed to moist air. They were miscible in ethyl ether.

Fractions d) and e) were put together and the mixture was subjected to careful fractionation in a rectifying column while operating under a residual pressure of 10 mmHg. In this way, the fractions reported hereinafter in Table I were separated. In this table there are also reported data relating to density, viscosity, equivalent acidimetric weight, and percentage composition determined on various fractions.

The infrared absorption spectra of the various fractions all were similar one to another, presenting absorption bands in the 5.25 $\mu$ zone and in the 5.6 $\mu$ zone, due to the presence of —COF and —COOH groups, respectively. The intensity of these absorption bands decreased for the various fractions as the boiling temperature increased.

Other infrared absorption bands present in all the fractions occured in the zones between 7.5 and 9.2 $\mu$ and also at 10.15, 11.2, 11.5, 12.05, 12.35, and 13.4 $\mu$.

Solubility tests of the various fractions in ethyl ether showed that, while fractions 1 and 2 could be mixed in all ratios with the ethyl ether, fractions 10 and 11, on the contrary, were practically immiscible therewith. The other fractions showed an intermediate behavior.

All of these fractions were completely miscible in all the perfluorinated solvents examined.

Fraction f) had an average density $d_{24}^{24}$ of 1.8953 and an average equivalent acidimetric weight, of about 4,000, as determined in an aqueous NaOH solution in accordance with the conditions described in Table 1. The average percent composition was : C = 21.6 percent; F = 68.5 percent; O = 9.9 percent.

In fraction f) the following viscosities were determined at various temperatures:

| temperature, °C: | 24 | 30 | 40 | 50 |
|---|---|---|---|---|
| viscosity, centipoises: | 264 | 193 | 117 | 76 |

The infrared absorption spectrum of the product of which fraction f) consisted revealed, besides the presence of small absorptions in the zones of the —COF and —COOH groups, a wide absorption between 7.5 and 9.2 $\mu$ with a maximum of about 8.0 $\mu$, and other characteristic absorptions at 10.15, 11.2, 11.5, 12.05, 12.35, and 13.4 $\mu$.

50 g of fraction f) were heated with 5 g of KOH in the form of pellets for a period of 2 hours at a temperature of 240°–250°C at atmospheric pressure, in a 100-cc flask which was part of a distillation apparatus. During this treatment, the development of carbon dioxide, fluoroform, and water vapor were observed. At the end of this treatment, the contents of the vessel were subjected to vacuum distillation. About 40 g of colorless, transparent oil having a boiling range between 120° and 200°C at 0.2 mm Hg were thus obtained. This product no longer showed an acid character, was completely non-reactive towards water and alkaline solutions, and had an infrared absorption spectrum in which the absorptions due to the acid functions were completely absent.

Average molecular weight was determined to be of the order of 3,000.

By N.M.R. analysis the chain was shown to consist essentially of the same structure as the starting product, except that the terminal group "A" (fluoroformate isomer groups) had become a mixture of $-CF_2H$ and $-CFH-CF_3$ in a ratio of about 3:1. The terminal group $-O-CF_2H$ was revealed by the resonance bands of 2 atoms of fluorine at +83.3 p.p.m. from $CFCl_3$. The terminal group $-O-CFH-CF_3$ was revealed by the resonance bands of 3 fluorine atoms at +85 p.p.m. and of 1 atom of fluorine at +146.2 p.p.m.

The residual fraction g) had a viscosity at 24°C higher than 2,000 centipoises, a density $d_{24}^{24}$ of 1.9104, and showed an exceptional resistance to thermal treatment, both in air and under high vacuum, without indicating any symptom of modification in structure after prolonged periods of heating at temperatures of about 400°C. The average percent composition was : C = 21.5 percent; F = 68.7 percent; O = 9.8 percent. The infrared absorption spectrum of this fraction was completely similar to that of the preceding fractions, except for the very low intensity of the absorptions corresponding to the acid groups.

Fractions f) and g) were miscible in all proportions with all the perfluorinated solvents examined, such as, for example, perfluorocyclobutane, perfluorotributylamine, and perfluoropropylpyrane. They were, by contrast, immiscible with conventional organic solvents, such as, for example, acetone, ethyl ether, tetrahydrofurane, toluene, $CCl_4$, $CHCl_3$, $CH_2Cl_2$, dioxane, dimethylsulfoxide, dimethylformamide, ethyl acetate, etc.

0.4 liter, in which the U.V.-ray lamp was contained, was used as the reactor. 165 g of perfluoropropylene and 200 cc of perfluorocyclobutane were collected in the reaction vessel by distillation at −78°C. The reaction was started by passing into the reactor an oxygen stream (about 50 l/h) and lighting the U.V.-lamp, with the temperature at −45°C. The reaction was continued for a period of 11 hours, during which time the temperature of the liquid phase gradually rose until it reached −9°C and a total of about 18 N liters of oxygen were absorbed. Under these conditions the value of the index I was greater than 5.

$C_4F_8$, the unreacted perfluoropropylene, and those products having a boiling temperature lower than 25°C at atmospheric pressure were distilled off. The residue consisted of 95 g of a liquid product having the average percent composition and the average molecular weight corresponding to $(C_3F_6O_{1.07})_n$ wherein $n$ is about 14–16. The N.M.R. spectroscopic analysis indicated that the product had an average formula

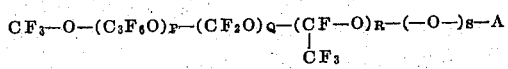

wherein the (Q+R)/P ratio was about 0.05, the R/Q ratio was about 0.1, and A was essentially the $-COF$ group.

Iodometric analysis showed the presence of active oxygen in amounts corresponding to a ratio S/(P+Q+R+1) of 0.03.

The product gave the following fractions when subjected to distillation:

| Fraction | Weight (g) | Distillation Interval |
|---|---|---|
| A) | 11.6 | 25–90°C/760 mm Hg |
| B) | 20.3 | 90–160°C/760 mm Hg |
| C) | 29.2 | 50–100°C/0.2 mm Hg |
| D) | 15.2 | 100–150°C/0.2 mm Hg |
| E) | 12.8 | 150–280°C/0.2 mm Hg |
| F) | 3.0 | residue |

The products obtained, for the same distillation interval, showed characteristics equivalent to those of the products obtained in Example 1. As can be seen, the presence of a solvent during the reaction resulted in the formation of a product having a lower average boiling temperature.

TABLE 1

| Number of fractions | g. | Distillation interval (° C.) at 10 mm. Hg | $d_{24}^{24}$ | Equivalent acidimetric weight * | Viscosity (centipoises) at 24° C. | Percentage composition C | F |
|---|---|---|---|---|---|---|---|
| 1 | 7.8 | 67.5–93.0 | 1.7877 | 497 | 6.4 | 20.62 | 64.1 |
| 2 | 8.2 | 93.0–114 | 1.8035 | | | | |
| 3 | 8.5 | 114–130 | 1.8260 | 1,044 | 11.0 | 20.86 | 67.0 |
| 4 | 7.3 | 130–140 | 1.8239 | | | | |
| 5 | 8.1 | 140–150 | 1.8342 | 1,477 | 15.5 | | |
| 6 | 7.8 | 150–157 | 1.8352 | | | | |
| 7 | 8.3 | 157–168 | 1.8380 | 2,640 | 22.9 | 21.12 | 68.0 |
| 8 | 8.0 | 168–180 | 1.8520 | | | | |
| 9 | 8.2 | 180–193 | 1.8517 | 2,832 | 32.3 | | |
| 10 | 8.1 | 193–208 | 1.8574 | | | | |
| 11 | 11 | 208–225 | 1.8684 | 3,150 | | 21.22 | 68.3 |

* The equivalent weights reported were obtained by introducing about 0.4 g. of exactly weighed product into 25 cc. of 0.1 N NaOH keeping the whole in strong agitation for 2 hours at room temperature and titrating back with 0.1 N NCl using phenolphthalein. In the thus neutralized solution, the F ions present were determined with thorium nitrate. The ratio between the weight in grams of the starting product and the difference between the number of acid equivalents of the product and the number of the equivalent of fluorine ions was considered as the equivalent acidimetric weight.

EXAMPLE 2

The same apparatus as in Example 1 was used, except that a cylindrical glass vessel having a volume of

EXAMPLE 3

Under the conditions of the preceding example, 135 g of $C_3F_6$ and 340 g of $CCl_4$ were reacted with oxygen.

After 6 hours of radiation with continuous bubbling of oxygen (50 l/h) at temperatures comprised between −37° and −5°C, 7.5 liters of oxygen had been absorbed. The reaction was stopped and, after removal by distillation of the products which were volatile at room temperature, two liquid layers resulted. The lower liquid phase (about 25 g) was separated and gave fractions of products having boiling temperatures between 40°C/760 mm and 230°C/0.3 mm when distilled. The upper liquid layer gave, after removal of $CCl_4$, 8 g of liquid products containing only C, F and O and having boiling temperatures between 80° and 210°C/760 mm. At the same boiling temperature, the products obtained showed characteristics completely equivalent to those of the products described in Examples 1 and 2.

EXAMPLE 4

A photochemical reaction between $C_3F_6$ and oxygen was carried out with conditions analogous to those of the preceding example, except that 275 g of methylene chloride were used as diluent in lieu of $CCl_4$. After a 6 hour reaction period, the two liquid layers present in the reaction medium were separated and distilled. A total of 28 g of fluoroxygenated products were obtained, which products had a distillation interval between 45°C/760 mm Hg and 250°C/0.6 mm Hg and which exhibited properties very similar to those of the products obtained in the preceding example.

EXAMPLE 5

An apparatus was assembled consisting of a cylindrical glass vessel having a capacity of 0.4 liter and provided with a thermometer and a gas inlet tube dipping down to the bottom and communicating with the atmosphere by means of a reflux condenser cooled at −78°C and containing an ultraviolet-ray lamp of the type defined in Example 1. In this vessel, 460 g of $C_3F_6$ were distilled at −78°C and the photochemical reaction was started by radiation with ultraviolet light and by feeding a stream of dry air (60 l/h) to the liquid phase kept at −70°C. The air left the reactor and was removed after passage through the condenser at −78°C, which recycled at least a portion of the entrained $C_3F_6$ back to the reactor. As the reaction proceeded, the temperature of the liquid phase rose gradually until it reached 25°C, after about 8 hours of reaction. The liquid product remaining in the reactor (108 g) was distilled and separated into the following fractions:

| A) | 5 g | 30–57°C/760 mm |
|---|---|---|
| B) | 11 g | 45–98°C/18 mm |
| C) | 35 g | 80–166°C/0.3 mm |
| D) | 90 g | 166–260°C/0.3 mm |
| E) | 25 g | residue |

These had characteristics completely equivalent to those of the corresponding products described in Example 1.

EXAMPLE 6

This example illustrates how one may directly obtain a polyperoxide of perfluoropropylene by reacting the olefin with oxygen in the presence of U.V. radiations of an appropriate spectrum. For this purpose there was used a low pressure mercury-vapor quartz generator of the NK 6/20 Hanau type, having an emission spectrum containing a high percentage of radiations having a wave-length lower than 2.600 A and an absorption of 8 watts. In this lamp those radiations having a wave-length lower than 3,300 A corresponded to 0.9 watts by working at room temperature. This source of U.V. light was contained in a tubular quartz sheath having a size of 245 × 20 mm and was immersed into 490 g of liquid perfluoropropylene placed in a 0.6 liter glass vessel provided with a dipping tube for the introduction of oxygen, and a reflux condenser kept at −78°C, which vessel was immersed in an outer cooling bath. With this experimental apparatus the irradiation index I was calculated to be less than 1.

A closed system was prepared for the circulation of molecular oxygen. By means of this system the oxygen withdrawn from a 10-liter gasometer by means of a circulating pump and dried, was fed to the reaction vessel and, when leaving the latter through the condenser at −78°C, was washed with an aqueous KOH solution and recycled to the starting gasometer. The reaction was started by activating the U.V. lamp, keeping the perfluoropropylene at a temperature between −65° and −75°C, and by feeding oxygen through it at a flow rate of about 50 liters/hour.

After 11 hours, 2.4 liters of oxygen had been absorbed. At this point the reaction was stopped and the unreacted perfluoropropylene was removed from the reactor by distillation at −30°C. It contained about 0.3 percent of epoxide.

17.0 g of a liquid-semisolid product were obtained as the residue which analyzed as:

C 19.83%; F 62.73%; O 17.44%

These data are very close to an average limit formula $(C_3F_6O_2)_n$.

The N.M.R. spectrum showed that this substance consisted essentially of groups of $-CF(CF_3)-CF_2-$ that were bonded to each other by oxygen bridges prevailingly of the $-O-O$ (peroxidic) type and only in part by $-O-$(ether)bridges. It furthermore was shown by the N.M.R. spectrum that the terminal groups were essentially $-O-CF_3$ and $-O-COF$ in 1:1 ratio and in such amounts as to lead to the formula $(C_3F_6O_2)_n$ with a value of n equal to about 40.

The presence of oxygen in the peroxidic form was also demonstrated by iodometric titration carried out as previously described. There resulted 7.8 g of active oxygen per 100 grams of product, which corresponded to 0.9 atom of active oxygen per $C_3F_6$ unit.

The polyperoxide of perfluoropropylene thus obtained was remarkably stable at room temperature. When heated in the pure state to a temperature above 70°–80C, it decomposed in a violent manner by evolving gaseous and low-boiling products, leaving practically no liquid residue.

EXAMPLE 7

Under the reaction conditions as described in Example 6, but operating at a temperature of −29°C and with a molecular oxygen flow of 20 liters/hour, a photochemical oxidation of 505 g of perfluoropropylene was carried out for 22 hours. At the end of the reaction, by distillation of the unreacted olefin, there were obtained 71 g of a liquid acid product having a high viscosity at room temperature and a percent composition corresponding to the formula $(C_3F_6O_{1.6})_n$.

The N.M.R. analysis showed that the chain consisted prevailingly of $C_3F_6$ units bonded by ether and peroxidic bridges in a ratio of about 1:1. There were also present in the chain $-CF_2O-$ units in a ratio to $-C_3F_6-$ units of about 1:15.

The terminal groups present were mainly $CF_3-O-CF_2-CF(CF_3)-O-$ groups with minor amounts of $CF_3-O-CF_2-O-$ and $CF_3-O-CF(CF_3)-O-$ groups and also, in decreasing amounts, $-O-CF_2-CF(CF_3)-O-COF$, $-O-CF(CF_3)-CF_2-O-COF$, $-O-CF(CF_3)-CF_2-O-COF$, $-O-CF_2-O-COF$, and $-O-CF_2-COF$ units.

The iodometric analysis was in agreement with a content of 0.5 atom of active oxygen per $C_3F_6$ unit present in the chain.

This product showed an acidimetric equivalent weight of 1000, as determined by prolonged agitation of a sample with a cold 0.1 N NaOH solution and a back titration of the unreacted alkali excess and of the hydrolyzed fluoride ions of the $-COF$ groups.

This example shows that, by varying certain conditions as compared to those described in Example 6 (more particularly, by increasing the irradiation time and the reaction temperature), it is possible to obtain products having an intermediate composition between that of a polyperoxide and that of a polyether of perfluoropropylene.

EXAMPLE 8

This example was carried out in the same manner as that described in Examples 6 and 7 with a U.V. lamp having an emission of 0.9 watts in order to carry out a photooxidation of 700 grams of perfluoropropylene at a starting temperature of $-30°C$, using an oxygen feed flow rate of 20 l/h.

The photooxidation was carried out for a period of 560 hours while the temperature increased until a temperature of $-10°C$ was attained. At this point there were obtained, after evaporation of the unreacted monomer and of the volatile reaction products, 560 grams of a polymeric product having a percent composition corresponding to the formula $(C_3F_{5.95}O_{1.18})_n$ and containing (by iodometric analysis) 0.08 atom of active oxygen per $C_3F_6O$ unit.

This example shows that it is possible to obtain polyether products with a slight content of peroxidic bridges directly from the reaction, by increasing the irradiation time and consequently the conversion degree (which in this case was higher than 70 percent) even though adopting an irradiation index I lower than 1.

EXAMPLE 9

This example demonstrate that, although using a relatively high irradiation intensity, it is possible to obtain polyether products characterized by a high content of peroxidic groups, provided that the process is carried out so as to maintain in the reaction zone a low conversion of $C_3F_6$, for example lower than 20 percent. It is desirable for this purpose to carry out the process in a continuous manner, for example as follows.

An apparatus was prepared which comprised a 0.5 liter glass reactor containing a liquid phase of perfluoropropylene, in which the previously described Q 81 Hanau type high-pressure mercury-vapor U.V. radiation generator was immersed. With these conditions the average irradiation index was about 4 watts/cm². A dipping tube to the bottom of the reactor permitted the introduction of an oxygen flow which then left the reactor, through a condenser kept at $-78°C$. The unreacted oxygen was washed with alkaline solution and sent into a 50 liter gasometer from which, by means of a circulating pump, it was continuously reintroduced, after drying, into the photochemical reactor. The amount of oxygen consumed in the reaction was periodically replenished in the system.

To the photochemical reactor, a perfluoropropylene flow was also continuously fed from a 50-liter gasometer by means of a circulating pump.

The level of the liquid phase in the reactor was maintained constant by a continuous discharge, through the bottom, of a corresponding amount of liquid, which was sent to a continuous fractionated distillation system. From this system, the olefin and the compounds, if any, boiling below 20°C, were recycled as gases to the gasometer and the liquid reaction products were collected separately. The reacted perfluoropropylene was periodically replenished in the system.

With the described apparatus, a reaction was carried out by initially introducing into the reactor, 600 g of $C_3F_6$ and by feeding through it, at a temperature of $-35°$ to $-30°C$, an oxygen flow of 80–100 liters/hour and a perfluoropropylene flow of about 100 liters/hour. After 42 hours, 330 N liters of oxygen were adsorbed and 2,850 g of polymeric liquid products were obtained. Analysis of the residual $C_3F_6$ in the system showed that it contained 22.2 percent by weight of epoxide $C_3F_6O$, corresponding to a production of 190 g of epoxide.

The liquid product obtained had the following average composition:

$$C = 21.14\%; \quad F = 66.93\%; \quad O = 11.92\%$$

corresponding to the formula $(C_3F_6O_{1.27})_n$.

Determination of molecular weight resulted in a determination that the integer n in the above formula had an average value between 10 and 15. N.M.R. and iodometric analyses show that the product consisted of a mixture of low polymers formed prevailingly of a repetition of $-CF_2-CF(CF_3)-$ units bonded to each other by ether and peroxidic bridges that were present in 4:1 ratio. The neutral terminal groups of the chains were $CF_3-O-CF_2-CF(CF_3)-O-$, $CF_3-O-CF_2-O-$, and $CF_3-O-CF(CF_3)-O-$ groups in the respective ratios of 10:3:1, whereas the terminal group of acidic nature consisted of $-O-CF_2-CF(CF_3)-O-COF$, $-O-CF(CF_3)-CF_2-O-COF$, $-O-CF_2-O-COF$, and $-O-CF_2-COF$ in the respective ratios of 10:3.5:1:0.5.

As described hereinbelow, from the acid products obtained as described above and having a certain content of peroxidic groups, by suitable treatments it is possible to obtain neutral products having a very high thermal and chemical stability. A treatment of this type may consist substantially of a neutralization with alkali and of thermal decomposition of the salts, thus eliminating the carboxylic groups and most of the peroxidic bridges. 600 g of KOH (85 percent) in the form of pellets were introduced into a 3 liter vessel provided with an agitator, a reflux condenser and a charging tube. The vessel was heated to 100°C and the slow introduction of the crude acid oil was started, while vigorously agitating. The temperature rose to 130°–140 °C while within 6 hours the introduction of 2.0 kg of fluorooxygenated product was completed. The salt formed was kept in agitation for a further 24 hours at a temperature of about 140°C. By eliminating the circulation of water from the reflux condenser, the water contained in the vessel was then permitted to distill together with a small fraction of neutral low boiling fluorooxygenated oils while the inner temperature rose to 320°–330°C. During this stage, the evolution of a considerable amount of gas, mainly consisting of $CO_2$, was observed.

After a further period of 4 hours of heating to 300°–320°C, the content of the reactor was cooled and the oil previously steam-distilled was added. All the liquid contained was then filtered to remove the solid salts, prevailingly consisting of KF. In total, 1,350 g of neutral fluorinated oils were obtained, which by distillation were fractionated into the fractions having the characteristics reported in the following table.

TABLE 2

| Fractions | Distillation range | g | Composition | Average-molecular weight |
|---|---|---|---|---|
| I | 50–100°C/1 mm Hg | 460 | $C_3F_6O_{1.09}$ | 600–1,000 |
| II | 100°C/0.1 mm – 200°C/0.1 mm | 555 | $C_3F_6O_{1.05}$ | 1,000–2,000 |
| III | 200°C/0.1 mm – 350°C/0.05 mm | 300 | $C_3F_6O_{1.03}$ | 2,500–3,500 |
| IV | residue | 30 | $C_3F_6O_{1.02}$ | 5,000 |

All these fractions exhibited no oxidizing power and presented an exceptional chemical stability. In the infrared absorption spectrum of these products the presence of bands characteristic of acid groups could not be observed.

The spectroscopic analyses by N.M.R. showed that the structure of the chain was virtually the same as the structure of the chain of the starting product, however the structure of the terminal group "A" (fluoroformate isomer groups) had been changed to a mixture of — $CF_2H$ and —$CFH$—$CF_3$ in a ratio of about 3:1.

EXAMPLE 10

The photochemical reaction was carried out in a glass cylindrical reactor having a diameter of 245 mm and a volume of 22 liters, in the center of which there was placed coaxially a Hg vapor lamp of the Hanau No. 5661 type, consisting of a tubular quartz well (sheath) having a diameter of 46 mm and a length of 250 mm containing an irradiating quartz element of the TQ 1200 type which emits a total of 34 watts of radiations having a wave length lower than 3,000 A.

In the reactor there were also placed a dipping tube reaching the bottom for the introduction of oxygen, a thermometric well (sheath) immersed in the liquid phase, a gas outlet tube, and another dipping tube for recycling $C_3F_6$. The gas outlet tube was connected to a condenser kept at −78°C by a mixture of alcohol and dry ice. The condensate was recycled to the reactor through the aforedescribed dipping tube while the residual gaseous mixture was passed to a washing system wherein it was bubbled first through water and then through a 40% KOH aqueous solution. To the washed gas thus obtained there was added fresh $O_2$ coming from a gas reservoir (in order to replace that absorbed by the reaction) and after careful drying over concentrated $H_2SO_4$, the whole was passed back, by means of circulation pump, and bubbled into the reactor. The entire reaction system thus described was filled with oxygen and 25.75 kg of liquid $C_3F_6$ (at its boiling point) were charged into the reactor. Thereafter, while circulating oxygen at a flow-rate of 1,000 l/h, the lamp was switched on.

After about 10 minutes the absorption of oxygen commenced with an initial rate (measured by a metering device inserted at the gas reservoir outlet) of about 250 l/h.

The reaction was carried out for 17 hours, during which time the temperature of the liquid phase gradually rose from −30° to −10°C and the absorption rate gradually decreased until it reached a minimum rate of 50 l/h. A total of 2,280 liters of oxygen had been consumed (measured under room conditions). At this point the lamp was switched off and the reaction mixture was slowly heated up to 30°C, while collecting and condensing the gaseous products distilling from the reactor. They weighed 6.60 kg and consisted of unreacted perfluoropropylene (76.2 percent) and of the epoxide of perfluoropropylene (18.8 percent). The gaseous mixture also contained small amounts of products having a higher boiling point, which were found to be analogous to those which the successive fraction consisted of.

The residual mixture remaining in the reactor was then heated to 100°C, while bubbling oxygen through it in order to facilitate the removal of low-boiling compounds, and was kept at this temperature for 3 hours, during which time there were distilled 640 g of a mixture of products essentially consisting of 130 g of hexafluoropropylene, 25 g of epoxide $C_3F_6O$, 30 g of perfluoro-4-methyl-1,3-dioxolane

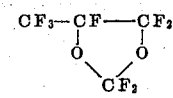

(boiling point 8°C),
110 g of perfluoro-2,4-dimethyl-1,3-dioxolane

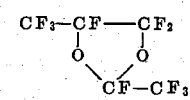

(boiling point 32.5°C)
52 g of perfluoro-1-methoxyisopropyl fluoroformate

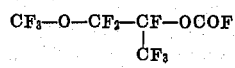

(boiling point 51°C);
67 g of perfluoro-2-(5-methyl-4,7-dioxa)-octyl fluoroformate

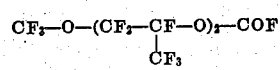

(boiling point 110°–114° at 755 mm, 85° at 270 mmHg) and the higher homologues, more specifically, 75 g of

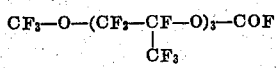

(boiling point 155°–8° at 755 mm, 82°C at 35 mm), 25 g of

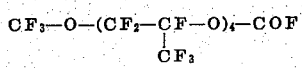

(boiling point 93°–5° at 20 mmHg), and 20 g of

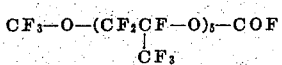

(extrapolated boiling point, 225°–230°C at 760 mm).

At boiling temperatures intermediate with respect to those of the aforedescribed oligomers, there were present minor amounts of oligomers of analogous structure but characterized by the presence of the following chain terminal groups (instead of $CF_3O-$) : $CF_3-O-CF_2-O-$ and

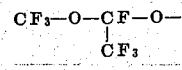

More particularly, the following products were isolated:

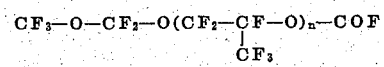

wherein $n = 1$ (boiling point 85°–90°C),
wherein $n = 2$ (boiling point 132°–138°C), and wherein $n = 3$ (boiling point 173°–180°C), and products belonging to the series

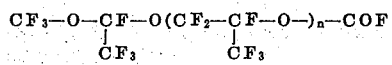

wherein $n = 1$ (boiling point 95°–105°C),
wherein $n = 2$ (boiling point 144°–152°C), and wherein $n = 3$ (boiling point 185°–192°C).

Higher oligomers which were not separated from each other by distillation were also present.

The residual oily product weighed 17.16 kg and had an oxidizing power corresponding to 0.37 active oxygen atoms per 10 oxygen atoms contained in the oil and an experimental elemental composition of $C_3F_{5.99}O_{1.13}$.

Various spectroscopic determinations and molecular weight determinations indicated that these products had the prevailing average formula $CF_3-O-(C_3F_6O_{1.042})_{14}-COF$ with a ratio of terminal groups

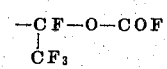

to $-CF_2-O-COF$ corresponding to about 5.

N.M.R. analysis showed however that the average ratio of $-CF_2O-$ units to $C_3F_6O$ units in the molecules was about 1:20.

A sample (100 g) of this product was subjected to distillation and the following fractions were obtained: 5 g with a boiling point between 60° and 100°C under atmospheric pressure; 19.3 g with a boiling point between 52° and 158°C at a pressure of 20 mmHg; 69.1 g with a boiling point between 98° C (at 0.1 mmHg) and 344°C (0.7 mmHg); and a residue of 1.6 g that could only be distilled at higher temperatures.

The washing solutions (water and KOH) were mixed and analyzed. They contained 24 mols of $CO_2$, 72 mols of HF, and 24 mols of trifluoroacetic acid.

This example thus illustrates that one may directly obtain reaction products with a very low content of peroxidic groups by reaction of $C_3F_6$ with $O_2$, upon using irradiation conditions such that the I value ($100 \times E)/(S^{1/2} V^{1/3}$) is greater than 2. In this example this value was calculated as between 6 and 7.

EXAMPLE 11

An apparatus was assembled consisting of a cylindrical stainless-steel reactor having a volume of 0.80 liter, a diameter of 70 mm, provided with an inner tubular quartz well (diameter 20 mm and length 185 mm), steel reflux condenser (cooled to $-50°C$ by circulation of cold alcohol), gas-inlet dipping tube and thermometer well. The assembly was so constructed as to withstand pressures of 10 atmospheres. A valve and a manometer placed on the top of the reflux condenser permitted the reading and regulation of pressure.

An U.V. lamp of the type described in Example 1 was placed within the quartz sheath. In the reactor air was replaced with oxygen. Then, by distillation, 1,050 g of perfluoropropylene were introduced and oxygen was passed through the dipping tube to a total pressure of 7 atmospheres, using for this purpose a cylinder provided with pressure regulator. At this point the lamp was switched on while keeping the reaction zone at $-60°C$ by means of an outer bath of alcohol and dry ice. After a few minutes pressure in the reactor began to decrease. The pressure was then kept at the desired value (7 atmospheres) by the introduction of oxygen from the cylinder, and this procedure was continued for 2 hours. At this point, the lamp was switched off, the pressure was slowly released, and the gaseous products were evaporated. These essentially consisted of unreacted perfluoropropylene, 0.6 g of the epoxide of perfluoropropylene and the oxidation products ($COF_2+CF_3-COF$) derived from 0.025 mols of $C_3F_6$.

As the residue there remained 51 g of an oily product having an oxidizing power corresponding to 0.65 active oxygen atoms per 10 atoms of total oxygen contained, and having an average elemental composition of $C_3F_6O_{1.18}$, with an average molecular weight of about 3,200. In this example, the value of the I index ($100 \times E)/(S^{1/2} V^{1/3}$) was calculated as higher than 3.

Thus, this example shows that by adopting sufficiently high irradiation intensities, it is possible to operate under an oxygen pressure markedly higher than atmospheric pressure without obtaining appreciable formation of peroxidic products.

Moreover, since the operation was carried out at a low temperature, N.M.R. analysis showed the presence of only traces of the groups $-O-CF_2-O-$ and

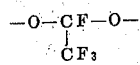

in the chain.

EXAMPLE 12

An apparatus was assembled consisting of a glass reactor in the form of a cylinder and having a diameter of 80 mm and a capacity of 0.7 liters, containing coaxially therein a quartz tubular well having a diameter of 40 mm. In this well was placed a Hanau high pressure U.V. ray lamp of the TQ 81 type which emits a total of 3.8 watts of radiations having wave lengths lower than 3,300 A. The reactor was also provided with thermometer, gas-inlet dipping tube, and reflux condenser kept at −78°C by means of an alcohol-dry ice mixture.

A system analogous to that described for Example 10 was employed for washing, drying and recycling of the residual oxygen leaving the reflux condenser (after introduction of make up to replace the consumed amount).

720 g of perfluoropropylene were charged into the reactor and condensed by means of an outer bath. The temperature of the liquid was maintained at about −32° C and the U.V. lamp was switched on while contemporaneously circulating oxygen at a flow-rate of 100 l/h. After 1 hour and 35 minutes 10.7 liters of oxygen had been absorbed. The lamp was switched off and the gaseous and low-boiling products were distilled from the reactor.

The residual oily products amounted to 120 g, had an oxidizing power corresponding to 0.52 active oxygen atoms per 10 total oxygen atoms contained, and had an experimental elemental composition corresponding to $(C_3F_{5.95}OB\&1.18)_n$.

The average value of n was between 10 and 20.

The gaseous and low-boiling products contained, in addition to unreacted perfluoropropylene, 9 g of the epoxide of perfluoropropylene and minor amounts of the gaseous products described in Example 10.

The washing solution was found to contain 0.28 mols of HF, 0.09 mols of perfluoroacetic acid, and 0.09 mols of $CO_2$.

For this example the value of the I index $(100 \times E)/(S^{1/2} V^{1/3})$ was calculated as about 3 in accordance with this value, the content of peroxidic groups for the total product was very low.

EXAMPLE 13

The apparatus described in Example 12 was used, but the quartz well containing the lamp was replaced by a well of the same size but made of Pyrex glass.

715 g of perfluoropropylene were charged into the reactor and an oxygen stream was bubbled in (100 l/h), irradiation being carried out for 4 hours and 15 minutes. A total absorption of 7.15 liters of oxygen (measured under room conditions) occured. The temperature of the reaction mixture was kept at about −32° C.

After having evaporated the volatile products at room temperature (consisting mainly of unreacted $C_3F_6$ along with 6 g of the epoxide of perfluoropropylene), there remained as residue an oily product weighing 74 g and having a oxidizing power corresponding to 1.9 active oxygen atoms per 10 atoms of total oxygen contained.

The elemental composition of this product was $C_3F_{5.94}OB1.32$.

In this example a filter (glass well) was used which, as shown by photometric measurements carried out separately, eliminated 90% of the radiations having a wave length lower than 3,300 A. Since the luminous power penetrating the reaction system had thus been reduced to 1/10, the value of I, which in the preceding example was about 3, in this example was reduced to 0.3. Thus, this example shows that at this low value of I the oxidizing power of the product obtained was markedly raised.

EXAMPLE 14

An apparatus was employed which included a quartz test tube having a diameter of 18 mm and a volume of 40 cc, provided with reflux condenser kept at −78°C with alcohol and dry ice, and with a dipping tube for the introduction of gas. In contact with a side of this small reactor and arranged so that the two axes were parallel, there was placed an Hg-vapor lamp of the low pressure Pen Ray type (without use of filters). This lamp has, in the useful zone, an emission of 0.5 watts.

38 g of perfluoropropylene were initially introduced into the quartz test tube, the lamp was switched on, and bubbling of an oxygen stream (10 l/h) was commenced. The irradiation was carried on for 5 hours.

The mixture was kept, during the whole reaction, at its boiling point. After having evaporated the volatile products at room temperature (essentially consisting of unreacted $C_3F_6$ together with 0.1 g of the epoxide of perfluoropropylene), there remained as residue an oily product weighing 11 g and having an oxidizing power corresponding to 1.2 active oxygen atoms per 10 atoms of total oxygen contained.

The experimental elemental composition of this product was $C_3F_6O_{1.19}$. In this example, the experimental set up made it possible to use only 1/6 of the useful U.V. light emitted by the lamp. Therefore the value of I was calculated as about 0.75. Thus, this example demonstrates that also with this geometry of the system, a low value of I corresponds to a high content of peroxidic groups.

EXAMPLE 15 (COMPARATIVE)

The same experimental arrangement was used as in the preceding example, but instead of the low-pressure lamp, there was employed a Pen Ray lamp provided with a suitable filter which eliminated all of the U.V. radiations except those at 3,660 A. The reactor, containing 40 g of perfluoropropylene, was then irradiated while bubbling in an oxygen stream (10 l/h) for 6 hours. After evaporation of the gaseous products, which essentially consisted of $C_3F_6$, no appreciable amount of oily product was observed. Thus, in this comparative example it was demonstrate that radiations having a wave length of 3,660 A were essentially ineffective for the preparation of the polyether products of the invention.

EXAMPLE 16

A photochemical oxidation was carried out using 35 kg of perfluoropropylene kept in the liquid phase at a temperature of −40° to −35°C in a cylindrical reactor (diameter 270 mm and a length of 250 mm) in the center of which a tubular quartz well was introduced having a diameter of 46 mm and containing an irradiating element of the Hanau TQ 81 type which emits a total of 3.8 watts of radiations having a wave length lower than 3,300 A. To the bottom of the reactor was passed a stream of dry oxygen (100 l/h). The gases leaving the reactor, after passage through a reflux condenser cooled to −78°C, were recycled (after adding make up oxygen to replace that amount consumed during the reaction, washing with alkali, and drying). The reaction was carried out for 110 hour, by which time 980 liters of oxygen had been consumed. By distillation of the unreacted perfluoropropylene and the volatile reaction products, 4.8 kg of polyether products were obtained in the form of a thick viscous liquid. They had an average elemental composition corresponding to the formula $C_3F_{5.96}O_{1.26}$, and a peroxidic group content corresponding to 2.1 g of active oxygen per 100 g of product.

The N.M.R. spectrum and the molecular weight determinations corresponded to a general formula

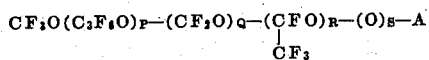

in which
P+Q+R = about 32
(Q+R)/P = 0.03
R/Q = less than 0.1
S/(P+Q+R) = 0.22
A was a —COF group prevailingly present in the forms

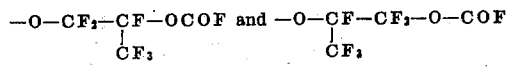

the ratio of these groups being 4:1. Thus, this example shows that it is possible to obtain polyethers having a high content of peroxidic groups at a degree of conversion not higher than 20 percent, with a low irradiation index I (in this case between 0.5 and 1), even when this is primarily due to the use of a high ratio between the reactor volume and the energy emitted by the U.V. lamp.

EXAMPLE 17

1,070 g of perfluoropropylene were introduced into a stainless steel autoclave having an inner diameter of 70 mm and a volume of 800 cc, and provided with a coaxial inner well of transparent quartz having an outer diameter of 26 mm and a length of 185 mm, and with a dipping tube for the introduction of oxygen, and with a stainless steel reflux condenser kept at a temperature of −80°C. The system was capable of withstanding pressures of 20 atmospheres. By means of a cylinder provided with pressure regulator, oxygen was introduced through the dipping tube until an absolute pressure of 7 atmospheres was reached. At this point, by utilizing a discharge valve placed after the condenser, the oxygen flow leaving the reactor was adjusted to a rate of 40 liters/hour measured at atmospheric pressure, while through a continuous feeding of gaseous oxygen, the pressure inside the reactor was kept constant at 7 atmospheres. An U.V. lamp of the high pressure Hanau TQ 81 type was introduced into the quartz well. By means of a bath placed outside the autoclave the temperature of the liquid phase was adjusted at +10°C, the lamp was switched on and, by appropriate regulation of the outer bath, the temperature was kept at +10°C for 2 hours. With this irradiation arrangement, the index I was 4.4 watts/cm².

The outlet stream was bubbled through an aqueous KOH solution in order to neutralize and thereby retain the volatile acid products formed in the reaction.

At the end of the two hour period the lamp was switched off, the pressure was released, and the gases (unreacted $C_3F_6$, together with the perfluoropropylene epoxide) were washed in the alkaline solution.

645 g of product containing 42 g of perfluoropropylene epoxide were thus collected. From the liquid product which remained in the reactor a fraction of 11 g, boiling at between 0° and 50°C, was separated by distillation. This fraction prevailingly consisted of perfluoro-4-methyl-1,3-dioxolane (b.p. 8°C) and perfluoro-2,4-dimethyl-1,3-dioxolane (b.p. 32.5°C). The residue consisted of 298 g of an oily polymeric substance which, by elemental analysis showed an average composition of 63.7% of F and 20.2% of C, corresponding to the formula $CF_2O_{0.60}$ with an average molecular weight of about 1,200. By iodometric analysis (reaction with NaI in acetic anhydride plus $CF_2Cl—CFCl_2$ and successive titration with thiosulfate of the iodine released), there was determined a content of 1.7 oxygen atoms combined in peroxidic form per 10 atoms of etheric oxygen contained.

By N.M.R. examination this polymeric product was shown to consist of polyether chains containing groups —$CF_2O$— together with groups

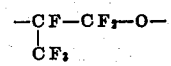

in a molar ratio between them of 1:1.5.

The spectroscopic data also showed that about half of the —$CF_2O$— units in the chain were in sequences of two or more of these units.

Groups of —$CF(CF_3)$—O— were also present in the polyether chain in an amount corresponding to about one such group per 20 groups —$C_3F_6O$—.

As regards the terminal groups, this polyether product was characterized by the presence of (1) $CF_3O$— groups in three different forms:

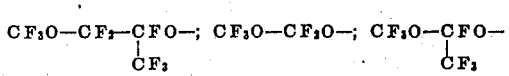

of which the first one was prevailing, and also by the presence of (2) acid terminal groups of five types:

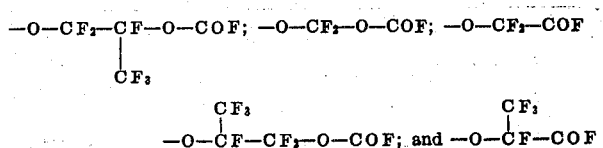

The gases leaving the reactor were washed with aqueous KOH solution, whereby it was determined that 156 g of $C_3F_6$ had been converted by oxidative demolition according to the reaction:

$$C_3F_6azO_2 \rightarrow CF_3-COF + COF_2$$

EXAMPLES 18 to 24

By using the same apparatus as described in the preceding example and by working analogously, a series of tests were carried out varying temperature and pressure of the reacting mixture.

The working conditions and the main data for the products obtained are reported in the following table. The characteristics of the polymeric products were obtained from experimental analytical results while the ratios relating to the various structural units contained in the polymeric chain were evaluated by examination of the N.M.R. spectrum, on the basis of the aforementioned criteria.

Example 24 is reported only for the sake of comparison. Thus, it shows that when the photochemical oxidation is carried out at low temperatures, and more particularly at temperatures of about −55° or below, the polymeric chain forming the oily polyether product contains virtually no units of the type $-CF_2O-$ and $-CF(CF_3)O-$.

TABLE 3

| Example No. | 18 | 19 | 20 | 21 | 22 | 23 | 24 |
|---|---|---|---|---|---|---|---|
| Reaction conditions |  |  |  |  |  |  |  |
| temp., °C | 22 to 24 | −2 to +2 | 10 to 12 | −2 to +2 | −2 to +1 | −8 to −5 | −60 to −55 |
| absolute pressure, atm | 7 | 7 | 5 | 5 | 3 | 3 | 1 |
| initial $C_3F_6$, g | 1070 | 1070 | 1080 | 1060 | 1070 | 1065 | 1040 |
| irradiation time, hours | 2 | 2 | 2 | 2 | 2 | 2 | 2 |
| Products obtained |  |  |  |  |  |  |  |
| $C_3F_6$ epoxide, g | 127 | 8 | 92 | 18 | 84 | 13 | 0.5 |
| polyether products, g | 135 | 335 | 180 | 275 | 164 | 300 | 94 |
| $C_3F_6$ recovered, g | 760 | 660 | 750 | 685 | 810 | 705 | 945 |
| Characteristics of polyether products composition by elemental analysis | $CF_{1.95}O_{0.58}$ | $CF_{1.98}O_{0.49}$ | $CF_{1.96}O_{0.56}$ | $CF_{1.97}O_{0.50}$ | $CF_{1.99}O_{0.47}$ | $CF_{1.98}O_{0.46}$ | $CF_{1.98}O_{0.36}$ |
| approxim. av. molecular wt. | 1000 | 2000 | 1200 | 2500 | 2500 | 3000 | 6000 |
| active oxygen content (act. $O_2$ g/100 g product) | 0.79 | 1.64 | 1.01 | 1.64 | 0.66 | 1.30 | 0.47 |
| Average structure |  |  |  |  |  |  |  |

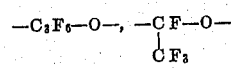

| (Q+R)/P | 0.72 | 0.28 | 0.55 | 0.36 | 0.33 | 0.24 | <0.01 |
| R/Q | 0.08 | 0.10 | 0.10 | 0.08 | 0.10 | 0.10 | 0.00 |
| S/(P+Q+R+1) | 0.08 | 0.17 | 0.11 | 0.17 | 0.07 | 0.14 | 0.05 |
| Prevailing structure of A | −COF −CF₂−COF | −COF −CF₂−COF | −COF −CF₂COF | −COF −CF₃−COF | −COF −CF₂−COF | −COF −CF₂−COF | −COF |

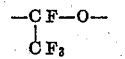

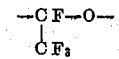

As will be apparent, changes and variations can be made in details, in practicing this invention, without departing from the spirit thereof.

We claim:

1. A linear perfluorinated polyether consisting of at least one repeating unit selected from the group consisting of $$-C_3F_6-O-, \quad -\underset{\underset{CF_3}{|}}{CF}-O-$$

and $-CF_2-O-$ units, said repeating units being linked one to another either directly or through an oxygen atom in which latter case there is a peroxy linkage, the sum of the repeating units present along the chain being from 1 to 100, the ratio of the sum of the total $-CF_2-O-$ units and total $$-\underset{\underset{CF_3}{|}}{CF}-O-$$

units to the total $-C_3F_6-O-$ units being from zero to 2, and the ratio of total active peroxidic oxygen units to the total $-C_3F_6-O-$ units being from zero to 1, said chain containing at least one $-C_3F_6-O-$ unit and having as terminal groups at one end a $CF_3-O-$ radical linked to said chain through a carbon atom and at the other end a $-COF$ radical linked to said chain through a non-peroxidic oxygen atom.

2. The perfluorinated polyether of claim 1, wherein the ratio of the sum of the total $-CF_2-O-$ units and the total $$-\underset{\underset{CF_3}{|}}{CF}-O-$$

units to the total $-C_3F_6-O-$ units is from 0.03 to 1.

3. The perfluorinated polyether of claim 1, said polyether having the formula $CF_3-O-(C_3F_6-O)-_pCOF$ wherein P is an integer from 1 through 5.

4. The perfluorinated polyether of claim 1, said polyether having the formula

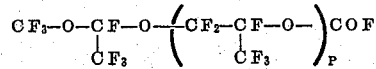

wherein P is 1, 2 or 3.

5. The perfluorinated polyether of claim 1, said polyether having the formula

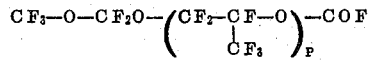

wherein P is 1, 2 or 3.

* * * * *

UNITED STATES PATENT OFFICE
CERTIFICATE OF CORRECTION

Patent No. 3,699,145    Dated October 17, 1972

Inventor(s) Dario Sianesi et al.

It is certified that error appears in the above-identified patent and that said Letters Patent are hereby corrected as shown below:

Title Page, Title: FLUORINATED OXYGEN-CONTAINING PRODUCTS AND PROCESS FOR PREPARATION THEREOF" should read -- PERFLUORINATED LINEAR POLYETHERS --. Column 21, line 47, "product," should read -- product; --.

Signed and sealed this 31st day of December 1974.

(SEAL)
Attest:

McCOY M. GIBSON JR.
Attesting Officer

C. MARSHALL DANN
Commissioner of Patents